UNITED STATES PATENT OFFICE.

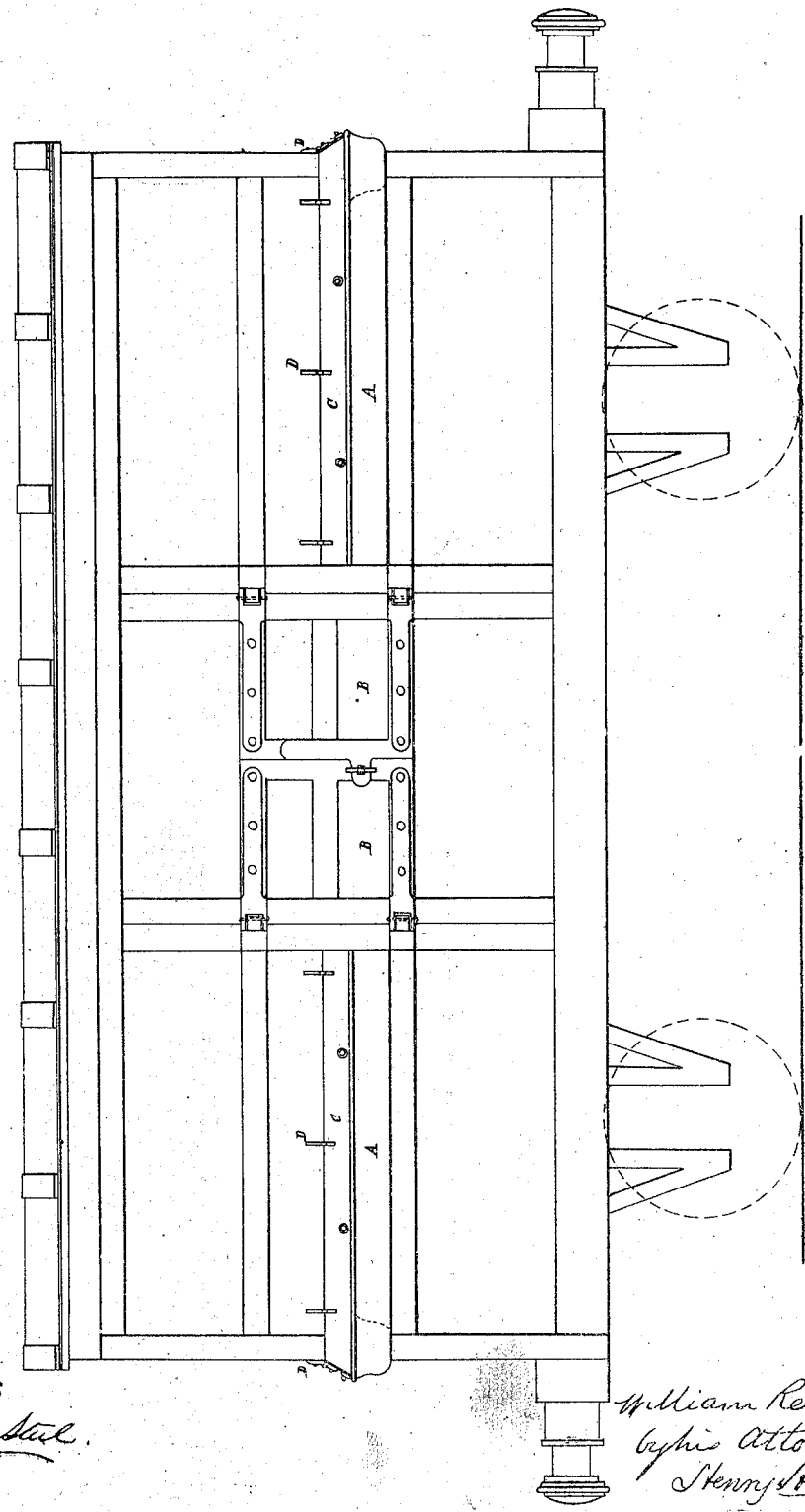

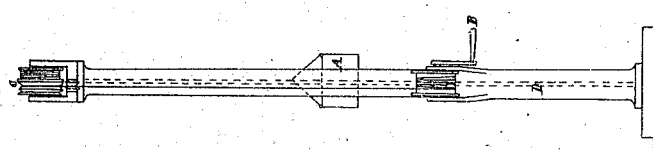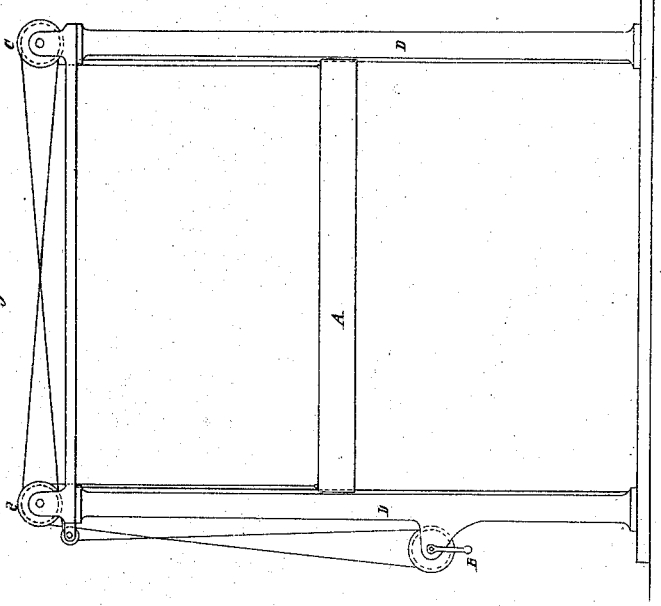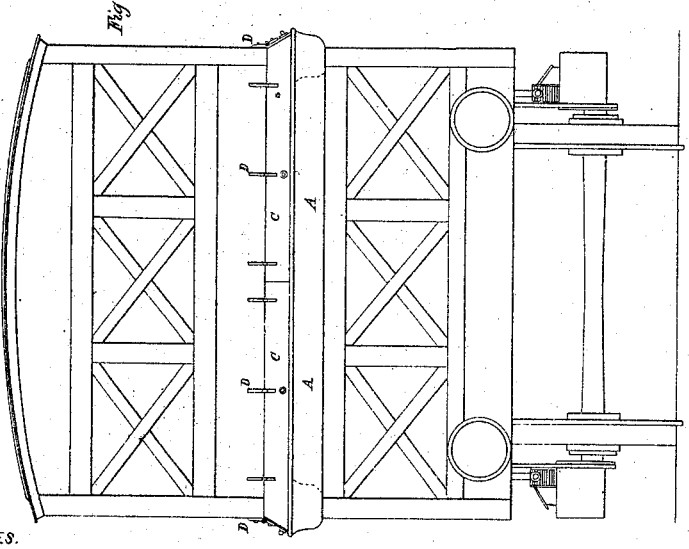

WILLIAM REID, OF GRANTON, NORTH BRITAIN.

IMPROVED METHOD OF SUPPLYING CATTLE WITH FOOD AND WATER ON RAILWAY-CARS.

Specification forming part of Letters Patent No. 75,701, dated March 17, 1868.

*To all whom it may concern:*

Be it known that I, WILLIAM REID, of Granton, Midlothian county, North Britain, have invented an Improvement in Cars for Transporting Cattle; and I do hereby declare the following to be a full, clear, and exact description of the same.

My invention relates to a peculiar arrangement whereby provision is afforded for keeping cattle supplied with food and water when traveling on railways; and consists, first, in constructing the wagons or trucks with troughs having an opening on the outer side for the convenience of supply, such troughs forming part of the wagon itself, or being capable of removal therefrom, as fully described hereinafter.

In order to enable others skilled in the art to make and use my invention, I will now proceed to describe its construction and operation, reference being had to the accompanying drawings, which form a part of this specification, and in which—

Figure 1, drawing No. 1, is a side view of my improved car; Fig. 2, drawing No. 2, an end view; and Figs. 3 and 4, views illustrating a device for raising a trough to such a position as to be readily secured to a car.

The troughs A are arranged upon the sides of a car in the form of a rectangular figure, three sides only being employed to complete the trough. The troughs extend into the car and also project beyond the outer side of the same, so that the water and food may be readily introduced to the troughs without opening the car and while the latter is detained at stations; and it will be observed that the troughs A being continuous, the water, when placed therein, will be level on all points. The troughs are not shown attached to the doors B of the wagon, as it is not considered requisite to attach them thereto, for the reason that the heads of the animals, when placed in the wagon, are generally situated toward the extremities of the sides and ends of the wagon. The troughs A are shown fixed at a height of about two feet nine inches, which height will generally be found suitable for cattle and horses. It will be necessary to fix the troughs at a lower level for sheep, at a distance from the bottom of the truck of about one foot four inches.

In the drawings, doors or covers C are shown arranged over the troughs A; but these may or may not be used, at discretion. When the troughs are to be filled with water or food, the covers C are lifted, being fitted with hinges D for the purpose of rendering them movable. The troughs may be attached to the wagons in any other convenient manner; but in building new trucks I prefer to use the arrangement shown in the drawing. The troughs may be put in sections, and connected together by channels or pipes, so as to allow the water to maintain the same level in each of the troughs; or they may be arranged to slide upward and downward vertically, and capable of adjustment to suit the height of large or small animals. In modifying existing cattle-wagons, special openings are cut around them, and troughs for water and food inserted into such openings and secured in any convenient manner.

Fig. 3 is a side elevation, and Fig. 4 an end view, of a frame arranged at the side of a line of railway, for elevating a detachable trough to such a position as to be readily connected to a car. A is the trough, which is raised or lowered by turning the winch-handle B, which actuates the pulleys C, the trough sliding vertically between the pillars D. The troughs may, however, be raised or lowered in any other convenient manner, and may be fitted with a hose for supplying the water from the usual tanks at railway-stations. A tank may be fixed at one or both ends of a set of troughs, or of one continuous trough, by which the trough would be at once supplied with water on the approach of a train; or tanks may be fixed at both ends and at intermediate places on a line of troughs.

I claim as my invention and desire to secure by Letters Patent—

A stationary or detachable tank or trough, arranged upon a railway-car so as to both extend into and project beyond the outer side of the same, substantially as and for the purpose described.

In testimony whereof I have signed my name to this specification in the presence of two subscribing witnesses.

WILLIAM REID.

Witnesses:
WILLIAM PURVES,
W. M. GOULD.